United States Patent Office 2,716,113
Patented Aug. 23, 1955

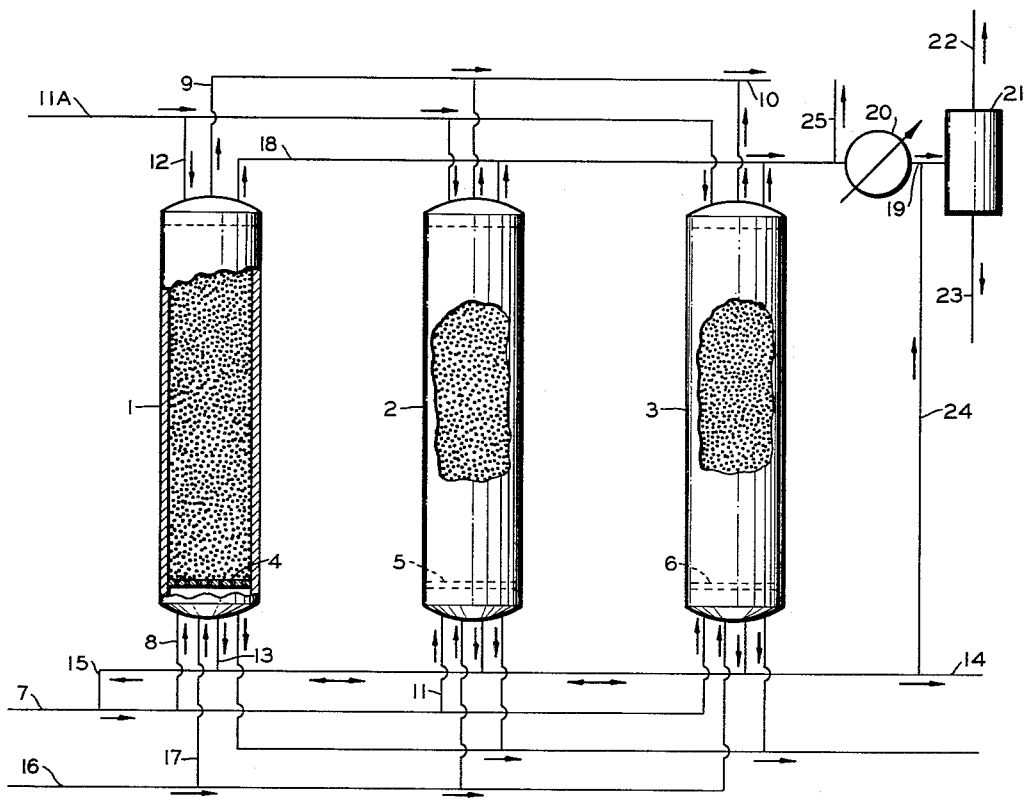

2,716,113

SEPARATION PROCESS

William Nelson Axe, Bartlesville, Okla., assignor to Phillips Petroleum Company, a corporation of Delaware Application June 26, 1950, Serial No. 170,430

13 Claims. (Cl. 260—96.5)

This invention relates to a process for the treatment of compounds which form adducts with urea or thiourea. In another of its aspects it relates to a process for the separation of an adduct-forming compound from a non-adduct-forming compound by the selective reaction thereof with urea or thiourea. In another of its aspects it relates to a process for the separation of an adduct-forming compound from a non-adduct-forming compound wherein there is utilized a fixed bed of urea or thiourea to form said adduct. In still another of its aspects it relates to a novel composition of matter comprising urea or thiourea supported on a granular support which is especially adapted to be used in a fixed bed process for the separation of an adduct-forming compound from a non-adduct-forming compound by selective reaction thereof with the said supported urea or thiourea. In yet another of its aspects this invention relates to a method for the decomposition of an adduct formed between an adduct-forming compound and urea or thiourea.

It has been known to the prior art that urea or thiourea will react with certain adduct-forming compounds to form adducts. Thus, for example, it is known that urea will react with straight carbon atom chain hydrocarbons having at least 6 carbon atoms per molecule to form a crystalline adduct which can be easily separated from non-adduct-forming compounds which have been admixed with the said adduct-forming compounds.

Further, it is known that the thiourea will react to form crystalline adducts with branched-chain hydrocarbons but will not form adducts with straight-chain or aromatic hydrocarbons. However, in the prior art, the solid urea or thiourea, as the case may be, was dissolved in a solvent medium and then poured into a liquid hydrocarbon and, upon vigorous agitation, the resulting crystalline adduct was separated from the liquid mixture by means of filtration and then regenerated to recover the adducted hydrocarbon. Obviously, although such technique may be entirely feasible, it would be advantageous to avoid it if possible. Accordingly, it would be highly desirable to possess a process for the separation of an adduct-forming compound from a non-adduct-forming compound by employing the ability of urea and thiourea to form adducts without resorting to the prior art technique of dissolving the urea or thiourea in the solvent prior to its contact with the mixture of compounds to be separated.

It has now been found that an adduct-forming compound can be separated from a non-adduct-forming compound by means of selective reaction with urea or thiourea, as the case may be, without moving the urea or thiourea, by placing the urea or thiourea as a crystalline mass in a fixed bed. The liquid mixture of an adduct-forming compound and a non-adduct-forming compound can then be passed through the fixed bed wherein the desired adducts will be formed without previously dissolving the urea or thiourea in a solvent. In operating such a process, the only materials which must necessarily be moved are those which are in a liquid state, and the solid materials, that is, the urea or thiourea, remain in a fixed position in the fixed bed. Accordingly, since liquids can be much more readily moved from point to point than can solid materials, the advantages which accrue from such a process are obviously desirable.

Further, it has been found that the adduct formed through the employment of the fixed bed process of this invention can be readily regenerated in situ by employing a hot gaseous medium which does not form an adduct with the urea or thiourea under conditions of the regeneration step. After the urea or thiourea has been suitably regenerated, it can be washed with a washing medium to remove any adduct-forming compounds which may remain in the bed in order to thereby prepare the bed for further use in the adduct-forming reaction. It has also been found that the urea or thiourea bed can be suitably cooled from the relatively high regeneration temperatures to the relatively low adduct-forming temperatures by employing a suitable cooling medium which is preferably of the type which will lend itself to cooling the regenerated urea or thiourea by a process of self-refrigeration effect of the washing medium.

Still further it has been found that it is preferable to employ urea or thiourea supported upon a porous granular support as the fixed bed of this process. Crystals of urea and thiourea increase in size and swell during the adduct-forming reaction and when such crystals are contained in a unitary mass, such swelling tends to limit and stop the flow of reactant liquids through the crystalline mass. In employing a supported urea or thiourea, the adduct-forming compounds can be brought into intimate contact with the urea or thiourea at a faster rate than when a support is not employed. Also, the porous support permits liquid flow through the urea or thiourea mass despite any swelling of the urea or thiourea as it becomes adducted.

It is an object of this invention to provide a process for the treatment of an adduct-forming compound with urea or thiourea.

It is another object of this invention to provide a process for the separation of an adduct-forming compound from a non-adduct-forming compound by means of selective reaction with urea or thiourea wherein the urea or thiourea is maintained in a fixed bed and only liquid materials are moved through the process.

It is still another object of this invention to provide a fixed bed process for the separation of an adduct-forming compound from admixture with a non-adduct-forming compound wherein only liquid materials are transported while the crystalline urea or thiourea and the crystalline adduct remains in the fixed bed.

It is yet another object of this invention to provide a method for the decomposition of an adduct formed between an adduct-forming compound and urea or thiourea wherein there is employed a hot inert gaseous or vaporous fluid as a heat carrier to decompose said adduct while it remains deposited in a fixed bed and particularly wherein the said fluid is further employed to wash and cool the resulting liberated urea or thiourea.

Still yet another object of this invention is to provide a supported urea or thiourea especially adapted to be employed in a fixed bed process for the separation of an adduct-forming compound from a non-adduct-forming compound.

Other objects and advantages of this invention will be apparent to one skilled in the art upon reading the specification and referring to the drawing wherein there is diagrammatically shown a preferred embodiment of this invention.

In the drawing, vessels 1, 2 and 3 are manifolded in parallel for intermittent operation wherein one of the beds can be on adduct-forming duty while the other two are being regenerated and readied for further adduct-forming duty. Urea or thiourea, as the case may be, and preferably, a supported urea or thiourea as will be more fully explained hereinafter, is contained in each of the vessels as a bed which can rest upon a suitable support such as grills 4, 5 and 6. Assuming first that the urea or thiourea bed in vessel 1 is to be on adduct-forming duty while the beds in vessels 2 and 3 are being regenerated, a feed stock which can comprise a mixture of adduct-forming and non-adduct-forming compounds is passed through lines 7 and 8 to vessel 1 and permitted to pass upwardly through the bed contained therein. In passing upwardly through the bed of urea or thiourea, there is formed an adduct between the adduct-forming compound and the urea or thiourea, which adduct remains in the bed as a solid crystalline material. The non-adduct-forming compound remains in a liquid state and is removed from the vessel through lines 9 and 10. When tests of the effluent material in line 10 indicate that the urea or thiourea contained in vessel 1 is substantially spent with respect to its ability to form adducts with the adduct-forming compound, the feed material passing through line 7 is switched from vessel 1 to vessel 2 by passing it through line 11 into such vessel. Previous to such switch, vessel 2 has been regenerated to ready the urea or thiourea contained therein for adduct-forming duty.

After the feed material has been switched to vessel 2 as just described, vessel 1 is regenerated, that is, the adduct contained therein is decomposed to liberate the adduct-forming compound and also urea or thiourea. The regeneration is accomplished by passing an inert gaseous or vaporous regeneration medium heated to a suitable temperature through lines 11A and 12 to thereby pass downwardly through the crystalline bed of adduct contained in vessel 1. In so doing, the adduct is heated by the hot regeneration medium and is decomposed to liberate the adduct-forming compound and the urea or thiourea, as the case may be. The mixture of regeneration medium and adduct-forming compound is removed from vessel 1 through lines 13 and 14 after which the adduct-forming compound can be separated as a product of the process by any suitable means such as fractional distillation or simple flashing.

During the initial stages of the regeneration or adduct decomposition step, the first material passing through line 13 will usually contain liquid feed holdup from the bed of adduct and can be either withdrawn from the process through line 14 or recycled to the feed through line 15. All subsequent drainings will represent predominantly the adduct-forming compound liberated from its urea or thiourea adduct by the hot regeneration medium and can be separately removed as a product of the process.

After all of the adduct in vessel 1 has been decomposed, it is ordinarily desirable to wash the liberated urea or thiourea in order to remove any adduct-forming compound therefrom which has not been previously removed by the hot regeneration medium. According to this invention, such a removal can be accomplished by passing a hot washing medium through lines 16 and 17 upwardly through the urea or thiourea contained in vessel 1. The washing medium containing any adduct-forming compounds removed from the bed in vessel 1 is removed through lines 18 and 19 and can be cooled in cooler 20. The resultant cooled washing medium is then passed to a separation zone 21 which can comprise a fractional distillation column wherein the washing medium can be removed through line 22 and the adduct-forming compound contained in said medium can be removed through line 23. As described, the first drainings from the regeneration step which comprise regeneration medium admixed with feed holdup washed from the vessel 1 can be passed through line 24 to line 19 and then fractionated in zone 21 along with the washing medium.

After the bed of urea or thiourea has been sufficiently washed to remove therefrom any adduct-forming compound, the bed will usually be at a temperature sufficiently high to prevent any adduct formation should the feed be passed into the bed immediately after the washing step. Accordingly, there is provided a cooling step wherein a cooling medium is passed through lines 16 and 17 upwardly through the bed of urea or thiourea in vessel 1 to be removed therefrom through lines 18 and 19. The cooling medium can be removed from the process through line 25 or alternately passed through line 19 to separation zone 21 wherein any adduct-forming compound which it may contain can be seperated therefrom.

The operation of vessels 2 and 3 is similar to the operation just described for vessel 1, it being understood that the vessels are alternately on adduct-forming duty, on regeneration or adduct decomposition duty and on washing and cooling duty. Thus, for example, the urea or thiourea contained in vessel 1 can be contacted with the feed to the process to form an adduct while the adduct in vessel 2 is being decomposed and while the liberated urea or thiourea in vessel 3 is being washed. After vessel 1 has had its adduct-forming power substantially depleted, vessel 3 can then be placed on stream and vessel 1 can be placed on adduct decomposition duty and while vessel 2 is being washed and cooled. In this manner, a continuous flow of feed material through line 7 can be processed in one of the vessels while the other two are being regenerated or prepared for adduct-forming duty.

In general, the feed to the process of this invention can comprise a mixture of an adduct-forming compound and a non-adduct-forming compound, that is, a mixture of compounds which will form adducts with urea or thiourea and compounds which do not form adducts with urea or thiourea. As a general proposition, straight carbon atom chain organic compounds form adducts with urea while branched-chain or cyclic organic compounds do not form such adducts. On the other hand, branched-carbon atom chain organic compounds form adducts with thiourea, while straight carbon atom chain compounds or aromatic compounds not having a branched-chain alkyl substituent of more than 6 carbon atoms do not form such adducts. The straight-chain compound which forms an adduct with urea can comprise one or more of a normal alkane or alkene hydrocarbon having from 6 to 50 carbon atoms per molecule, such as hexane, hexene, heptane, heptene, octane, octene, nonane, nonene, decane, decene, and progressively higher molecular weight alkanes and alkenes up to and including those containing as many as 50 carbon atoms per molecule. The straight-chain organic compound which forms adducts with urea can also be a straight carbon atom chain primary alcohol having from 6 to 50 carbon atoms per molecule and being either saturated or unsaturated and thus corresponding in carbon atom structure to the aforementioned alkanes and alkenes. Examples of such alcohols include hexanol, hexenol, heptanol, heptenol, octanol, octenol, nonanol, nonenol, undecanol, undecenol, and higher paraffinic and olefinic alcohols. Urea also forms adducts with primary amines having as one substituent an alkyl group or an alkylene group containing at least 8 carbon atoms arranged in a straight carbon atom chain as well as with straight carbon atom ketones having from 6 to 50 carbon atoms such as hexanone, pentanone, octanone, decanone, dodecanone, and docosonone, and with alkyl bromides and alkylene bromides corresponding in carbon atoms structure to the above mentioned straight-chain hydrocarbons and alcohols. Further, it will form adducts with straight carbon atom chain esters of straight-chain acids, such as the methyl, ethyl, propyl, butyl, pentyl, hexyl, heptyl, octyl, nonyl, and decyl esters of hexanoic, heptanoic, octanoic, undecanoic, dodecanoic and eiscosanoic acids. Adducts can also be formed between urea and aliphatic mercaptans having from 6 to 50 carbon atoms arranged in a straight carbon atom chain. Among such compounds are hexyl mercaptans, heptyl mercantans and octyl mercaptans and other mercaptans corresponding in molecular carbon atom structure to the above straight-chain hydrocarbons.

Urea does not form adducts with organic compounds having less than 6 carbon atoms per molecule or with those having a branched carbon atom chain or an aromatic structure.

Thiourea will form adducts with an organic compound which has a branched carbon atom chain containing from 5 to 50 carbon atom chains in the straight-chain portion of the molecule and from 1 to 20 carbon atoms in a side carbon atom chain. Thus, branched-chain hydrocarbons having the above number of carbon atoms per molecule and including branched-chain alkanes such as the methyl pentanes, the ethyl pentanes, the dimethyl and trimethyl pentanes, isohexane, the ethyl hexanes, the di-, tri- and tetrahexanes, the propyl hexanes, the methyl octanes, the ethyl and propyl octanes, isooctane, and other alkyl paraffins, such as the higher molecular weight alkyl paraffins, for example, methyl ethyl, propyl, butyl and hexyl hexadecanes, eicosanes, and pentacontanes, and including the branched-chain alkenes such as the ethyl hexenes, methyl pentenes, the ethyl pentenes, the di- methyl and trimethyl pentenes, the ethyl hexenes, the mono-, di-, tri- and tetramethyl and ethyl octenes, and other alkyl olefins including the higher molecular weight alkyl olefins, such as the methyl ethyl, propyl, butyl and hexyl hexadecenes, docosenes form adducts with thiourea. Thiourea will also form adducts with branched carbon atom chain alcohols having from 5 to 50 carbon atoms in a straight carbon atom chain and from one to 20 carbon atoms in a side chain. The hydroxyl radical can be attached to the 1-position or to any other position. For example, there is included in this group of alcohols the methyl pentanols, the methyl hexanols, the ethyl and propyl hexanols, the methyl, ethyl, propyl and butyl heptanols, the methyl, ethyl, propyl and butyl octanols, as well as such higher alcohols as dimethyl, trimethyl and tetramethyl docosanol. Also included are unsaturated alcohols having a like carbon atom configuration. Thiourea also forms adducts with branched carbon atom chain ketones having from 4 to 50 carbon atoms in the straight chain portion of the molecule and having a side chain containing from one to 20 carbon atoms, such as isobutyl ketone, the methyl hexanones, the methyl and ethyl heptanones, the methyl and ethyl octanones, and the methyl, ethyl, propyl and butyl nonanones; with the branched carbon atom chain amines and with secondary and tertiary amines having from 7 to 50 carbon atoms in the straight chain portion of the molecule and from 1 to 20 carbon atoms in a side chain, such as methylheptyl amines, dimethyl diethyloctyl amines, heptyl dimethyl amines, diheptyl amines and trioctyl amines. It also forms adducts with branched carbon atom chain mercaptans having from 6 to 50 carbon atoms in the straight chain portion of the molecule and having a side chain containing from one to 20 carbon atoms. Among such mercaptans are the methylhexyl, ethylhexyl, methylheptyl, ethylheptyl, propylheptyl, methyloctyl, methylnonal, and other mercaptans corresponding in molecular structure to the above branched chain hydrocarbons.

Thiourea does not form adducts with organic compounds having less than 5 carbon atoms per molecule or with those having a straight carbon atom structure or an aromatic carbon atom structure, said aromatic structure not containing a branched-chain alkyl substituent of 6 or more carbon atoms.

It is obvious from the foregoing discussion that urea and thiourea will form adducts with a large number of different compounds. Although there is set forth examples of numerous compounds which will form such adducts, numerous other compounds not specifically mentioned will similarly form adducts and a comprehensive and exhaustive enumeration of such compounds is highly impractical and would not aid in the understanding of this invention. Obviously, one skilled in the art, upon reading the present disclosure, can determine other adduct-forming compounds not specifically mentioned herein by means of mere routine test and without the exercise of inventive genius. After discovering such compounds, he will be able to practice the process of the present invention without having departed from the teachings that are contained herein.

According to one of the aspects of this invention, the feed material can comprise an adduct-forming compound admixed with a non-adduct-forming compound, each of which can be selected from one or more of the above illustrated compounds or others. Further, the non-adduct-forming compound can comprise non-alkylated aromatic compound or a non-adduct-forming aromatic compound irrespective of whether urea or thiourea is being employed as the adduct-forming reagent.

The conditions which are employed in the fixed beds of this process while forming adducts therein are such that the desired adduct is formed within a reasonable time and such that the desired extent of reaction is obtained. Generally, the temperature of the urea and thiourea adduct formation reaction can be selected from a temperature within the range of 50 to 100° F., preferably from 70 to 90° F. Thus, vessels 1, 2 and 3 can be maintained at a temperature within these ranges by controlling the temperature of the feed material introduced thereinto. The optimum temperature for adduct formation with any specific adduct-forming compound can be readily determined by mere routine test. The pressures employed within the vessels 1, 2 and 3 during the adduct-forming reaction should be sufficient to maintain the adduct-forming compound in a liquid phase and thus will depend somewhat upon the particular compound which is to form the adduct. Ordinarily, a pressure within the range between atmospheric and 300, preferably between 10 and 50, pounds per square inch can be employed. The rate of flow of a mixture of an adduct-forming and a non-adduct-forming compound through the bed of urea or thiourea should be adjusted to insure adequate time to permit the adduct-forming reaction to occur and is preferably adjusted so that the mixture remains in the urea or thiourea bed for a period within the range of 1 minute to 2 hours, preferably from 5 minutes to 30 minutes.

It is ordinarily preferable and often necessary to employ a suitable activator to insure that the rate of adduct formation between an adduct-forming compound and urea or thiourea will be within an operable range. Among such activators which can be employed to activate urea or thiourea are water; the low boiling aliphatic alcohols, such as methanol and ethanol; the low boiling ketones such as ethyl and propyl ketones; the low boiling organic esters such as methyl acetate and ethyl acetate; and nitrogen-containing compounds such as ammonia, aqueous solutions of ammonia, and ammonia derivatives including those having an alkyl, alkylene, hydroxyalkyl, acyl and aminoalkyl substituent wherein any aliphatic carbon atom chain in such substituent contains at least one but not more than 5 carbon atoms per radical. Representative of the group of compounds comprising such substituted ammonias are the mono-n-propyl, dimethyl, diethyl, monobutyl, and monopentyl amines, the monovinyl, divinyl, and monobutyl amines, and other amines including diethylenediamine, formamide, acetamide and dimethyl amino propane. Other nitrogen-containing compounds which can be employed include heterocyclic organic nitrogen base amines, such as pyrole, pyridine, piperidene, the picolines, pyramidine, pyroline, pyrazole, and pyrazine. The nitrogen-containing activators suitable for use in the process of this invention have been more fully described and claimed in an application, Serial No. 155,134, filed April 10, 1950, by Joseph I. Ackerman, Jr.

In decomposing the adduct formed during the adduct-forming reaction, the vessel containing the adduct is removed from adduct-forming duty as explained above and an inert gaseous or vaporous regeneration medium is passed downwardly through the adduct bed. The regeneration medium is heated to a temperature sufficiently hight to insure that the urea or thiourea adducts will be decomposed to liberate the adducted adduct-forming compound and the urea or thiourea, as the case may be. Ordinarily, a temperature within the range of 125 to 250° F., preferably from 140 to 175° F. is sufficient. Higher temperatures can be employed when desirable provided that the decomposition temperature is maintained below the melting point of urea (271° F.) or thiourea (360° F.). The pressure employed during the regeneration step can be within the range of atmospheric to 500, preferably from 10 to 50, pounds per square inch. The rate at which the regeneration medium is introduced into the bed containing the adducted urea or thiourea should be sufficient to insure that enough heat is introduced into the bed to decompose the adduct within a period of time suitably short to insure that the bed will be ready to go on adduct-forming duty when the adjacent parallel beds have become spent. Ordinarily a flow rate within the range of 10 to 100, preferably from 50 to 75, cubic feet of regeneration medium per cubic foot of adduct per hour is satisfactory. The regeneration medium can comprise an inert gas or vapor capable of being heated to the regeneration temperature and which will not, under conditions of the regeneration, form adducts with the urea or thiourea. Among such media are flue gas, methane, propane, butane, nitrogen and natural gas. The preferred regeneration medium is propane or butane or mixtures thereof.

The washing medium employed to wash any unremoved adduct-forming compound from the liberated urea or thiourea after the regeneration has been completed can comprise any of the aforementioned regeneration media but is preferably a low boiling hydrocarbon such as propane and butane, although any non-adduct-forming liquid can be used. Thus, such fractions as kerosene, gasoline, and naphtha can be used provided that substantially all adduct-forming compounds have been removed therefrom prior to the washing step. However, when such high boiling compounds are employed, it will ordinarily be necessary to provide rather extensive fractionation facilities to separate the removed adduct-forming compound from the washing medium. When propane or butane are employed as a washing medium, it is merely necessary to flash them from any adduct-forming compound which they may contain. The temperature employed during the washing step should be sufficiently high to prevent any liberated adduct-forming compound which is to be washed from the bed from re-forming an adduct with the urea or thiourea. Ordinarily a temperature within the range of those specified for the regeneration step can be employed. However, it is preferred to employ a temperature which is in the lower portion of such range in order to at least partially cool the bed of urea or thiourea while it is being washed. Thus, it is preferred to use a temperature within the range of 125 to 150° F. The rate of flow of washing medium through the bed of urea or thiourea should be such as to complete the washing operation within a reasonable time and ordinarily a rate within the range of 1 to 10, preferably from 3 to 6, gallons per cubic foot of thiourea per hour is sufficient.

After the urea or thiourea bed has been washed free from any urea or thiourea compound contained therein, it will be a temperature too high to permit adduct formation with any feed material introduced thereinto. There is provided according to the process of this invention, a cooling step wherein a cooling medium is introduced into the regenerated and washed urea and thiourea bed to cool it to a temperature suitable for adduct formation. Such cooling medium can comprise the same medium as is employed during the washing step and ordinarily it will be sufficient to merely provide a means of cooling the washing medium while permitting it to flow through the fixed bed of urea or thiourea. According to a preferred feature of this invention, propane and butane or mixtures thereof are employed as a washing and cooling medium. When the washing of the urea or thiourea bed has been completed, it will be merely necessary to reduce the pressure maintained on the bed to such an extent that the propane or butane evaporate thereby providing self- or auto-refrigeration for the bed and at the same time insuring adequate removal of the cooling medium from the bed prior to introduction of feed.

According to this invention, there is provided as the reactant urea or thiourea which is to react with an organic adduct-forming compound to form adduct, a bed of urea or thiourea supported on a porous granular support. The support for the urea or thiourea can be one or more of an inert, granular, porous, cellular or fibrous material which is capable of supporting said urea or thiourea on its surface and which is inert to the adduct-forming reaction. The support should be substantially stable and non-decomposable under the conditions of the adduct-forming reaction and during the regeneration procedure. Among such supports can be mentioned cellulosic materials such as sawdust, wood shavings, ground corn cobs or cork, and inorganic minerals such as asbestos, fibrous vermiculite, charcoal, or pumice. Obviously, other inert granular and porous supports can be suggested by one skilled in the art or can be found by means of a routine test of probable materials once knowledge of this disclosure is obtained. The granular support can be comprised of particles having a standard mesh size within the range of 5 to 100, preferably 10 to 50, per inch. The urea or thiourea can be applied to the support by impregnation of the latter with an aqueous or other solution of urea or thiourea followed by drying at a temperature sufficiently high to evaporate the urea or thiourea solvent without causing said urea or thiourea to melt or fuse. Thus, a temperature within the range of 150 to 225° F. is satisfactory. In a preferred embodiment, the urea or thiourea is applied to the support by first moistening the support with a viscous liquid and tumbling or dusting the thus moistened support with finely ground urea or thiourea. The moistening agent for the support can be a suitable wetting liquid which does not form an adduct urea or thiourea, as the case may be, and it can be such liquids as castor oil, lubricating oil, and the like, but it is preferred to use a high boiling organic liquid which is substantially insoluble in the organic feed materials to be treated and which can serve the dual function of a moistening agent to bind the urea or thiourea powder to the support and of an activator for the urea or thiourea adduct formation. Among such preferred wetting liquids are glycerol, glycol, triethanolamine and diethanolamine. Other wetting liquids can be readily selected from the class of activators described above. When such high boiling insoluble activators are used, it will ordinarily not be necessary to use an activator during the process of adduct formation. The supported adduct-forming reagent can contain from 10 to 70 per cent by weight of urea or thiourea depending upon the nature of the support, but 30 to 60 per cent by weight is preferred. The amount of moistening agent employed should be sufficient to wet the surface of the granular support to such an extent that the urea or thiourea can be bound thereto. Ordinarily, from 0.1 to 10, preferably from 1 to 5, weight per cent of the adduct-forming reagent can be comprised of the selected moistening agent.

The process of this invention has numerous applications. Thus, it can be applied to the removal of waxy materials from kerosene, jet fuels, 5W oils and the like and to the removal of sulfur, nitrogen and oxygen compounds as well as other components from petroleum coal tar or shale oil fractions which will form crystalline urea or thiourea adducts more readily than will other components of the mixture.

While the invention has been described in connection with a present, preferred embodiment thereof, it is to be understood that this description is illustrative only and is not intended to limit the invention, the scope of which is defined by the appended claims.

I claim:

1. A process for separating an organic compound capable of forming a solid adduct with an amide selected from the class consisting of urea and thiourea from admixture with an organic compound not capable of forming such an adduct which comprises passing said admixture downwardly through a fixed bed of said amide bound on an inert granular support by a viscous activator for the adduct-forming reaction selected from a group consisting of glycerol, glycol, triethanolamine and diethanolamine at a rate sufficient to permit said admixture to contact said bed for a period of time within the range of one minute to 2 hours, maintaining said bed at a temperature within the range of 50° to 100° F. and under a pressure sufficient to maintain said admixture in the liquid phase, discontinuing flow of said admixture through said bed when the adduct-forming capacity of said amide has been depleted, regenerating the resulting adduct-containing bed by passing a regenerating medium comprising an inert gaseous heat carrier therethrough at a temperature within the range of 125 to 250° F. and at a pressure within the range of atmospheric to 500 pounds per square inch, removing said regenerating medium containing liberated adduct-forming organic compound and recovering said adduct-forming compound as a product, washing said regenerated bed with a liquid washing medium comprising a low boiling aliphatic hydrocarbon at a temperature within the range of 125° to 150° F. to remove any remaining adduct-forming compound therefrom, separating said washing medium from any adduct-forming compound which it contains, and cooling said bed by reducing the pressure on said bed containing said liquid washing medium to thereby cause said medium to evaporate and cool said bed.

2. A process for separating an organic compound capable of forming a solid adduct with an amide selected from the class consisting of urea and thiourea from admixture with an organic compound not capable of forming such an adduct which comprises passing said admixture through a fixed bed of said amide bound on an inert granular support by means of a viscous activator for the adduct-forming reaction, maintaining said bed at a temperature within the range of 50° to 100° F. and at a pressure sufficient to maintain said admixture in the liquid phase, regenerating said bed to decompose the resulting adduct thereby liberating the adducted organic compound and said amide by passing an inert gaseous regenerating medium therethrough at a temperature within the range of 125 to 250° F., recovering the resulting liberated adduct-forming compound as a product, washing said regenerated bed with a liquid washing medium comprising a low boiling aliphatic hydrocarbon to remove any remaining adduct-forming compound therefrom, and cooling said bed by reducing the pressure on said bed containing said washing medium to thereby cause said medium to evaporate and cool said bed.

3. A process for separating an organic compound capable of forming a solid adduct with urea from admixture with an organic compound not capable of forming such an adduct which comprises passing said admixture through a fixed bed of said urea bound on an inert granular support by means of a viscous activator for the adduct-forming reaction, maintaining said bed at a temperature within the range of 50° to 100° F. and at a pressure sufficient to maintain said admixture in the liquid phase, regenerating said bed to decompose the resulting adduct thereby liberating the adducted organic compound and said urea by passing an inert gaseous regenerating medium therethrough at a temperature within the range of 125 to 250° F., recovering the resulting liberated adduct-forming compound as a product, washing said regenerated bed with a liquid washing medium comprising a low boiling aliphatic hydrocarbon to remove any remaining adduct-forming compound therefrom, and cooling said bed by reducing the pressure on said bed containing said washing medium to thereby cause said medium to evaporate and cool said bed.

4. A process for separating an organic compound capable of forming a solid adduct with thiourea from admixture with an organic compound not capable of forming such an adduct which comprises passing said admixture through a fixed bed of said thiourea bound on an inert granular support by means of a viscous activator for the adduct-forming reaction, maintaining said bed at a temperature within the range of 50° to 100° F. and at a pressure sufficient to maintain said admixture in the liquid phase, regenerating said bed to decompose the resulting adduct thereby liberating the adducted organic compound and said thiourea by passing an inert gaseous regenerating medium therethrough at a temperature within the range of 125 to 250° F., recovering the resulting liberated adduct-forming compound as a product, washing said regenerated bed with a liquid washing medium comprising a low boiling aliphatic hydrocarbon to remove any remaining adduct-forming compound therefrom, and cooling said bed by reducing the pressure on said bed containing said washing medium to thereby cause said medium to evaporate and cool said bed.

5. A process for separating an organic compound capable of forming a solid adduct with an amide selected from the class consisting of urea and thiourea from admixture with an organic compound not capable of forming such an adduct which comprises passing said admixture downwardly through a fixed bed of said amide bound on an inert granular support by a viscous activator for the adduct-forming reaction maintained under such conditions of temperature and pressure that the desired adduct is formed therein, regenerating the resulting adduct-containing bed by passing inert gaseous regenerating medium therethrough at a temperature sufficiently high to decompose said adduct to liberate said adduct-forming compound and said amide, washing said regenerated bed with a liquid washing medium comprising a low boiling hydrocarbon at a temperature sufficiently high to prevent any remaining adduct-forming compound from re-forming an adduct with said amide, and cooling said bed by reducing the pressure on said bed containing said washing medium to thereby cause said medium to evaporate and cool said bed.

6. A process for separating an organic compound capable of forming a solid adduct with an amide selected from the class consisting of urea and thiourea from admixture with an organic compound not capable of forming such an adduct which comprises passing said admixture through a fixed bed of said amide bound on an inert granular support by a viscous activator for the adduct-forming reaction to form said adduct, regenerating the resulting adduct-containing bed by passing an inert gaseous regenerating medium therethrough at a temperature sufficiently high to decompose said adduct, washing said regenerated bed with a washing medium comprising a low boiling hydrocarbon and cooling said bed by evaporating said washing medium from said bed.

7. In a process for regenerating an adduct formed between an amide selected from the class consisting of urea and thiourea and an organic compound capable of forming an adduct therewith wherein said adduct is disposed as a fixed bed, the method which comprises passing a regenerating medium comprising an inert gaseous heat carrier through said bed at a temperature within the range of 125 to 250° F. and at a pressure within the range of atmospheric to 500 pounds per square inch, washing said regenerated bed with a washing medium comprising a low boiling liquid aliphatic hydrocarbon at a temperature within the range of 125 to 150° F. to remove any remaining adduct-forming compound therefrom, and cooling said bed by reducing the pressure on said bed containing said washing medium to thereby cause said medium to evaporate and cool said bed.

8. In a process for regenerating an adduct formed between an amide selected from the class consisting of urea and thiourea and an organic compound capable of forming an adduct therewith wherein said adduct is disposed as a fixed bed, the method which comprises passing an inert gaseous regenerating medium through said bed at a temperature sufficiently high to decompose said adduct, washing said regenerated bed with a low boiling liquid hydrocarbon at a temperature sufficiently high to prevent any unremoved liberated adduct-forming compound contained in said bed from re-forming an adduct with the liberated amide and cooling said bed by evaporating said liquid hydrocarbon from said bed.

9. The method of claim 8 wherein said low boiling liquid washing hydrocarbon is selected from the class consisting of propane and butane.

10. In a process for preparing a fixed bed of regenerated amide selected from the class consisting of urea and thiourea for adduct-forming duty with an adduct-forming organic compound the method which comprises washing said regenerated bed with a washing medium comprising a low boiling liquid aliphatic hydrocarbon at a temperature within the range of 125° to 150° F. to remove any remaining adduct-forming compound therefrom, and cooling said bed by evaporating said washing medium from said bed.

11. An adduct-forming reagent comprising an inert porous support selected from the group consisting of sawdust, wood-shavings, ground corn cobs, ground cork, asbestos fibers, fibrous vermiculite, charcoal and pumice having an amide selected from the group consisting of urea and thiourea bound thereon by an oleaginous activator for the adduct-forming reaction selected from the group consisting of glycerol, glycol, triethanolamine and diethanolamine, said amide comprising from 10 to 70 weight per cent of said adduct-forming reagent.

12. An adduct-forming reagent comprising an inert porous support having an amide selected from the group consisting of urea and thiourea bound thereon by a viscous activator for the adduct-forming reaction, said amide comprising from 10 to 70 weight per cent of said reagent.

13. An adduct-forming reagent comprising an amide selected from the group consisting of urea and thiourea bound on an inert granular support by a viscous activator for the adduct-forming reaction.

References Cited in the file of this patent

UNITED STATES PATENTS

| | | |
|---|---|---|
| 2,336,643 | Schulze | Dec. 14, 1943 |
| 2,381,293 | La Lande | Aug. 7, 1945 |
| 2,386,200 | Drennan | Oct. 9, 1945 |
| 2,386,274 | Short et al. | Oct. 9, 1945 |
| 2,386,354 | Schulze et al. | Oct. 9, 1945 |
| 2,386,358 | Schulze et al. | Oct. 9, 1945 |
| 2,386,379 | Wolk | Oct. 9, 1945 |
| 2,499,820 | Fetterly | Mar. 7, 1950 |
| 2,520,715 | Fetterly | Aug. 29, 1950 |
| 2,520,716 | Fetterly | Aug. 29, 1950 |
| 2,577,202 | Lien et al. | Dec. 4, 1951 |
| 2,613,204 | Fetterly | Oct. 7, 1952 |

FOREIGN PATENTS

| | | |
|---|---|---|
| 969,716 | France | May 31, 1950 |